United States Patent [19]

Fujii et al.

[11] Patent Number: 4,985,531

[45] Date of Patent: Jan. 15, 1991

[54] BIREFRINGENT TRANSPARENT FILM AND PROCESS FOR PRODUCING THE SAME

[75] Inventors: Sadao Fujii; Junji Takase; Hideki Kawai, all of Hyogo, Japan

[73] Assignee: Kanegafuchi Kagaku Kogyo Kabushiki Kaisha, Tokyo, Japan

[21] Appl. No.: 341,987

[22] Filed: Apr. 20, 1989

[30] Foreign Application Priority Data

Apr. 22, 1988 [JP] Japan ................................ 63-101107

[51] Int. Cl.$^5$ .......................... C08G 8/02; C08B 75/00
[52] U.S. Cl. .................................. 528/171; 528/125; 528/126; 528/128
[58] Field of Search ................ 528/171, 125, 126, 128

[56] References Cited

U.S. PATENT DOCUMENTS 2,928,295 12/1975 Rose ..................................... 528/220
4,008,203 2/1977 Jones ................................... 528/175

FOREIGN PATENT DOCUMENTS 0225630 6/1987 European Pat. Off. .
0277804 10/1988 European Pat. Off. .
0323160 7/1989 European Pat. Off. .

*Primary Examiner*—Morton Foelak
*Assistant Examiner*—P. Hampton-Hightower
*Attorney, Agent, or Firm*—Armstrong, Nikaido, Marmelstein, Kubovcik & Murray

[57] ABSTRACT

A transparent film having birefringence comprising an amorphous aromatic polymer as a main component is disclosed. The film is produced by uniaxially stretching a film of an amorphous aromatic polymer. The film exhibits high transparency, high heat resistance, and heat distortion resistance, and its birefringence does not undergo changes with time.

11 Claims, No Drawings

BIREFRINGENT TRANSPARENT FILM AND PROCESS FOR PRODUCING THE SAME

FIELD OF THE INVENTION

This invention relates to a transparent film showing birefringence and, more particularly, to a transparent plastic film showing optical birefringence which comprises an asymmetrically stretched amorphous aromatic polymer as the principal component.

BACKGROUND OF THE INVENTION

Optical films, which are enjoying an increasing demand in the field of optoelectronics, are required to exhibit both birefringence and extremely high transparency. Use of polyethylene terephthalate (PET) films for this purpose has been studied.

PET films, which have only a small birefringence in the unstretched state, show significant birefringence when stretched uniaxially. However, it is difficult to control the birefringence due to crystallinity in the stretched film. Further, the domains in which crystallization has been produced during stretching cause light scattering, thus reducing transparency. Furthermore, because the glass transition temperature of the stretched PET film may be as low as 70° C., the birefringence undergoes a gradual change during long term use.

SUMMARY OF THE INVENTION

In the light of the above-described circumstances, the inventors conducted extensive investigation with various materials and methods for processing them and, as a result, have now found films having birefringence which exhibit extremely high transparency, high heat resistance, reduced heat distortion and little change in birefringence over time.

That is, the present invention relates to a transparent film having birefringence which comprises an asymmetrically stretched amorphous aromatic polymer as the principal component.

The present invention further relates to a process for producing a transparent film having birefringence which comprises asymmetrically stretching a film comprising an amorphous aromatic polymer.

DETAILED DESCRIPTION OF THE INVENTION

The term of "an assymmetrical stretching" according to the present invention includes a uniaxial stretching and a biaxial stretching with a difference in stretching degree between the two directions.

The amorphous aromatic polymers which can be used in this invention include aromatic polyesters, aromatic polysulfones, and aromatic polyether sulfones. These polymers may be used either alone or in combinations of two or more thereof. Birefringent films are sometimes exposed to high temperatures during processing depending on their end use. In this connection, the aromatic polyester films are preferred because of their excellent transparency, high heat resistance, resistance to heat distortion, and small changes over time in birefringence which has been imparted by stretching.

The film comprising these polymers can be prepared by film extrusion or by film casting of a solution of the polymer in an appropriate solvent. The latter method is preferred from the viewpoint of evenness of film thickness and surface properties. The polymer film usually has a thickness of from several microns to several hundred microns.

The films thus obtained, particularly by casting, exhibit essentially no birefringence, as cast. Birefringence of extruded films, if exhibited, is negligible unless strong tension in the machine direction is imposed on the films during film extrusion. The extruded or cast film can be endowed with high birefringence by uniaxial stretching or biaxial stretching with a difference in stretching degree between the two directions. The conditions for stretching vary depending on the kind of the polymer constituting the film, the thickness of the film to be stretched, and the like. In general, the stretching temperature ranges from room temperature to a temperature higher than the glass transition temperature (Tg) of the polymer by 40° C., preferably from a temperature lower than Tg by 80° C. up to a temperature higher than Tg by 30° C. The stretch ratio is selected from the range of from 1.05:1 to 10:1, preferably from 1.1:1 to 5:1, according to the desired degree of birefringence. The greatest birefringence can be attained by stretching to just before a breaking point. In the case of attaining birefringence by biaxial stretching with a difference in stretch ratio between two directions, a difference of refractive indices ($\Delta n$) between two directions at right angles to each other in the same plane is in the range of from 0.0001 to 0.2, preferably from 0.0005 to 0.05, as measured by photometry, by means of a polarizing microscope or by an ellipsometer.

Transparency of the film of this invention, naturally varying depending on the film thickness, is usually 30% or more, preferably 60% or more, more preferably 80% or more, in terms of total light transmittance.

If desired, the film of this invention may have provided on one or both sides thereof an ordinary transparent hard coat layer for surface protection.

The present invention is now illustrated in greater detail with reference to the following examples, but it should be understood that the present invention is not deemed to be limited thereto. In these examples, all the percents are given by weight unless otherwise indicated.

EXAMPLE 1

A. Synthesis of Amorphous Aromatic Polyester

In 20 ml of a 1.25 N sodium hydroxide aqueous solution were dissolved 5 mmol of 2,2-bis(4-hydroxyphenyl)propane, 5 mmol of bis (3,5-dimethyl-4-hydroxyphenyl)methane, and 0.8 mmol of p-t-butylphenol. To the resulting aqueous solution was added a solution of 10.4 mmol of terephthalic acid chloride and 0.1 mmol of trioctylmethylammonium chloride (phase migratory catalyst) in 20 ml of o-dichlorobenzene. The mixture was allowed to react by stirring at room temperature for 3 hours. The aqueous layer of the reaction mixture was removed by decantation, and to the organic layer was added an equal amount of water. After neutralization with a small amount of hydrochloric acid, the organic layer was washed five times with water and then poured into a large quantity of methanol to precipitate the aromatic polyester produced. The yield of the resulting polyester was nearly 100%. The polyester had a Tg of 250° C. and an intrinsic viscosity ($\eta_{sp/c}$) of 0.60 (32° C., 0.32 g/dl-chloroform).

B. Preparation of Film

A 15% solution of the above-obtained polymer in 1,1,2,2-tetrachloroethane was cast on a glass plate and heated on a hot plate at 50° C. for 20 minutes, then at 100° C. for 20 minutes, and finally at 150° C. for 20 minutes. Thereafter, the cast film was stripped off the glass plate, fixed to a clamp at each of the four corners, and thermally fixed at 250° C. for 10 minutes to obtain a film about 100 μm thick.

A sample (5 cm×10 cm) was cut out of the film and longitudinally stretched at a ratio of 1.2:1, at 150° C., followed by cooling to room temperature. The resulting uniaxially stretched film was found to have a refractive index difference (Δn) of 0.006 between two directions at right angles to each other in the same plane, a total light transmittance of 90%, and a haze of 0.2% (measured according to ASTM D 1003). The film underwent no change in physical properties when kept at 50° C. for 1 month.

EXAMPLE 2

A. Synthesis of Amorphous Aromatic Polyester

In a 300 ml-volume eggplant type flask were charged 20.11 g of 2,2-bis(4-hydroxyphenyl)propane, 15.06 g of bis(3,5-dimethyl-4-hydroxyphenyl)methane, 0.95 g of p-t-butylphenol, 0.26 g of sodium hydrosulfite, 78.2 ml of a 5 N sodium hydroxide aqueous solution and 176.8 ml of water in a nitrogen atmosphere, mixed, and cooled to 5° C. to prepare an aqueous alkali solution of a dihydric phenol. Separately, 21.32 g of terephthalic acid chloride and 9.14 g of isophthalic acid chloride were dissolved in 255 ml of methylene chloride in another 300 ml-volume eggplant type flask in a nitrogen atmosphere, followed by cooling to 5° C. Further separately, 137 ml of water and 0.16 g of benzyltributylammonium chloride as a catalyst were charged in a 1 liter-volume separable flask in a nitrogen atmosphere and cooled to 5° C. To the catalyst solution were simultaneously added the above-prepared two solutions over 10 minutes by means of a metering pump. After 2 hours from completion of the addition, a solution of 0.42 g of benzoyl chloride in 5 ml of methylene chloride was added thereto while stirring. The stirring was continued for an additional 20 minutes. The aqueous layer was removed by decantation, and to the organic layer was added an equal amount of water. The organic layer was neutralized with a small amount of hydrochloric acid while stirring. The decantation and desalting by washing were repeated, and the residue was then diluted with 300 ml of methylene chloride. The solution was heated to 40° to 50° C. to remove the water as an azeotrope with methylene chloride, and the residual methylene chloride was removed by distillation until the polymer concentration reached 15%. The resulting polymer was found to have an intrinsic viscosity of 0.90 (32° C., 0.32 g/dl-chloroform).

B. Preparation of Film

The above-prepared methylene chloride solution of the polymer was cast on a glass plate, dried at room temperature for 1 hour, and then stripped off the glass plate. Each of the four corners of the film was fixed to a clamp and the film was thermally set at 150° C. for 15 minutes and then at 250° C. for 10 minutes to obtain a film of about 100 μm thick.

A sample (5 cm×10 cm) was cut out of the film and longitudinally stretched at a ratio of 1.5:1 at 200° C., followed by cooling to room temperature. The resulting uniaxially stretched film had a refractive index difference of 0.008 between two directions at right angles in the same plane, a total light transmittance of 90%, and a haze of 0.2%. The film underwent no change of physical properties when kept at 50° C. for 1 month.

EXAMPLE 3

A transparent polyether sulfone film of 5 cm in width, 10 cm in length, and 100 μm in thickness was longitudinally stretched at a stretch ratio of 1.5:1 at 220° C. and cooled to room temperature. The difference in refractive indices (Δn) between two directions at right angles to each other in the same plane was 0.005. The film had a total light transmittance of 89% and a haze of 0.5%. The film underwent no change of physical properties when kept at 50° C. for 1 month.

EXAMPLE 4

A transparent polysulfone film 5 cm wide, 10 cm long, and 100 μm thick was longitudinally stretched at a ratio of 1.5:1 at 180° C. and cooled to room temperature. The resulting uniaxially stretched film had a difference of refractive indices (Δn) of 0.006 between two directions at right angles to each other in the same plane, a total light transmittance of 89%, and a haze of 0.6%. The film underwent no change of physical properties when kept at 50° C. for 1 month.

EXAMPLE 5

A sample film (5 cm×10 cm) was cut out of the film, which was prepared in the same manner as of Example 2, and biaxially stretched in longitudinally at a ratio of 1.5:1 and transversely at 1.1:1 at 200° C., foiled by colling to room temperature.

The resulting biaxially stretched film had a refractive index difference of 0.006 between two directions at right angles in the same plane. Other properties were just the same as of the uniaxially stretched film obtained in Example 2.

As described above, there is provided by the present invention a plastic film showing birefringence and excellent transparency.

While the invention has been described in detail and with reference to specific embodiments thereof, it will be apparent to one skilled in the art that various changes and modifications can be made therein without departing from the spirit and scope thereof.

What is claimed is:

1. A transparent film having birefringence comprising an asymmetrically stretched amorphous aromatic polymer having a difference in refractive indices of from 0.0001 to 0.2 between two directions at right angles to each other in the same plane as the principal component.

2. A transparent film according to claim 1, wherein said amorphous aromatic polymer is selected from the group consisting of aromatic polyesters, aromatic polysulfones, and aromatic polyether sulfones.

3. A transparent film according to claim 1, wherein said amorphous aromatic polymer is an aromatic polyester.

4. A process for producing a transparent film having birefringence which comprises asymmetrically stretching a film comprising an amorphous aromatic polymer as the principal component.

5. A process according to claim 4, wherein said amorphous aromatic polymer is selected from the group consisting of aromatic polyesters, aromatic polysulfones, and aromatic polyether sulfones.

6. A process according to claim 4, wherein said amorphous aromatic polymer is an aromatic polyester.

7. A process according to claim 4, wherein said asymmetrical stretching is performed at a temperature between room temperature and 40° C. above the glass transition temperature of said amorphous aromatic polymer.

8. A process according to claim 4, wherein said asymmetrical stretching is uniaxial stretching.

9. A process according to claim 4, wherein said asymmetrical stretching is biaxial stretching.

10. A transparent film having birefringence according to claim 1, wherein the difference in refractive indices is from 0.005 to 0.05.

11. A process according to claim 4, wherein said asymmetric stretching is performed to obtain a stretch ratio between 1.05:1 and 10:1.

* * * * *